United States Patent [19]

Yamaguchi et al.

[11] 4,444,842

[45] Apr. 24, 1984

[54] MAGNETIC RECORDING MEDIUM

[75] Inventors: Nobutaka Yamaguchi; Nobuo Tsuji; Yasutoshi Okuzawa; Norio Nasu; Masaaki Fujiyama, all of Kanagawa, Japan

[73] Assignee: Fuji Photo Film Co., Ltd., Kanagawa, Japan

[21] Appl. No.: 358,564

[22] Filed: Mar. 16, 1982

[30] Foreign Application Priority Data

Mar. 19, 1981 [JP] Japan ................................ 56-40156

[51] Int. Cl.³ ............................................. G11B 5/72
[52] U.S. Cl. .................................... 428/340; 360/134; 360/135; 360/136; 427/128; 427/131; 428/447; 428/694; 428/695; 428/900
[58] Field of Search ............... 428/694, 695, 900, 447, 428/692, 340; 427/128, 31; 360/134–136

[56] References Cited

U.S. PATENT DOCUMENTS 3,993,824 11/1976 Shirahata ........................... 428/216
4,189,514 2/1980 Johnson ............................. 428/900
4,369,230 1/1983 Kimura .............................. 427/128

Primary Examiner—Ellis P. Robinson
Attorney, Agent, or Firm—Sughrue, Mion, Zinn, Macpeak and Seas; 38

[57] ABSTRACT

A magnetic recording medium is disclosed which is comprised of a non-magnetic support base having a magnetic layer on one surface and a silicone oil layer formed on the opposite surface. The silicone oil layer does not produce dropouts and eliminates scraping and therefore eliminates dust particles that collect and build up in the area of the magnetic head. The silicone layer is formed from a silicone-containing compound having a viscosity of at least 6,000 centistokes at 25° C.

8 Claims, No Drawings

MAGNETIC RECORDING MEDIUM

FIELD OF THE INVENTION

The present invention relates to a magnetic recording medium, and more particularly, to a magnetic recording medium having a reduced number of dropouts and a base which does not cause dust particles to build up on the surface of the magnetic head.

BACKGROUND OF THE INVENTION

Magnetic recording media are manufactured by applying a dispersion of ferromagnetic particles and a binder onto a non-magnetic base such as polyester film and drying the same. When the media are used repeatedly, the surface of the base opposite the magnetic layer is scraped by the magnetic recording apparatus, producing white powder that builds up on the transport system of the apparatus. This phenomenon has adverse effects on audio tape, video tape and memory tape, and video tape is particularly vulnerable. More recently video tape is adapted to high-density recording at a recording wavelength of 2 to 3 μm or is a miniature video tape that is used many times. When using these tapes, increase in dropout level and dust buildup on the magnetic head due to the scraped base are fatal. In order to eliminate these defects, a method has been proposed which involves covering the other surface of the base with a back coating, as described in, for example, U.S. Pat. Nos. 4,135,031 and 4,135,032. However, this method is not satisfactory because it increases manufacturing costs and the unevenness of the surface of the back coating is transferred onto the surface of the magnetic layer which decreases the color video S/N ratio and increases the chroma noise.

SUMMARY OF THE INVENTION

It is the primary object of the present invention to provide a magnetic recording medium that (1) does not cause many dropouts and (2) has a base which is not scraped producing dust particles that build up on the magnetic head.

These and other objects of the present invention are achieved by a magnetic recording medium that comprises a non-magnetic base and a magnetic layer formed thereon and in which a silicone oil layer is formed on the other surface of the base opposite the magnetic layer.

DETAILED DESCRIPTION OF THE INVENTION

The term "silicone oil" as used herein is the genetic term for silicone-containing compounds, which include dimethyl polysiloxane, methylphenyl polysiloxane and fluorine-containing polysiloxane. Oils which are useful for the present invention are high-viscosity silicone oils having a viscosity of at least 6,000 centistokes at 25° C., preferably at least 100,000 centistokes at 25° C. Dimethyl polysiloxanes having the following formula are particularly preferred for the purpose of the present invention:

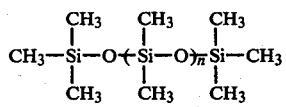

wherein n is an integer. Specific examples are KF 96-100, KF 96H-10,000, KF 96H-1,000,000 (products of Shinetsu Chemical Industry Co., Ltd.) and TSF 451-50 and TSF 451-300,000 (Toshiba Silicone Co., Ltd.). Suitable silicone oils are also described in U.S. Pat. Nos. 2,654,681 and 4,135,016 which are incorporated by reference.

The silicone oil may be applied onto one surface of the non-magnetic base before a magnetic layer is formed, or the silicone oil may be applied to the opposite surface of the base after a magnetic layer is formed. An undercoat may be formed between the silicone oil layer and the base. If the silicone oil layer is formed before a magnetic layer is formed on the base, care should be taken to avoid the transfer of silicone oil onto the surface of the base on which the magnetic layer is to be formed. The base with the silicone oil layer is then wound up into a roll and a few days later, is unwound and coated on the other surface with a magnetic layer. In this case, to prevent uneven application of the magnetic solution that is repelled by silicone oil, the surface of the base on which the magnetic layer is formed is preferably given some treatment such as cleaning with a detergent. Technically speaking, it is easier to form the magnetic layer on one surface of the base first and then form the silicone oil layer on the other surface. In this case, a slight amount of the silicone oil may be transferred onto the magnetic layer during storage. Therefore, in order to increase the long-term stability of the web, silicone oil may also be applied onto the surface of the magnetic layer.

The amount of the silicone oil to be applied varies with the type of the magnetic recording medium being produced, the mechanism and material of the magnetic recording apparatus (transport system), the material and strength of the base, as well as the difference in contact between the magnetic recording medium and various sections of the transport system due to the bend strength and thickness of the medium. Therefore, the proper amount of silicone oil is determined by considering these factors and the desired durability of the medium. If too much silicone oil is used, dust particles build up on the magnetic head perhaps because the silicone oil is transferred onto the surface of the magnetic layer in a great amount. Furthermore, the silicone oil fouls the part of the production equipment that contacts the magnetic recording medium being produced. Therefore, an advantageous amount of the silicone oil ranges from 0.5 to 20 mg/m$^2$, preferably from 1 to 15 mg/m$^2$, more preferably from 5 to 10 mg/m$^2$.

The silicone oil layer of the present invention may contain additives such as an oiliness improver and a thermal-oxidation stabilizer.

Examples of the magnetic particles and the additives to be incorporated in the magnetic layer (e.g., binder, lubricant and abrasive) as well as the method of preparing the magnetic recording medium of the present invention are described in U.S. Pat. Nos. 3,597,273, 3,840,400, 4,068,040, 4,135,016 and 4,321,025, which are incorporated by reference. It is to be noted that magnetic recording media prepared by forming a thin magnetic film directly on the base by means of plating or vapor deposition are also included within the scope of the present invention. Such magnetic recording media are described in U.S. Pat. Nos. 4,226,681 and 4,239,835 which are incorporated by reference.

The present invention is now described in greater detail by reference to the following examples and comparative examples which are given here for illustrative purposes only and are by no means intended to limit its scope. In the examples and comparative examples, all parts are by weight.

EXAMPLE 1

A composition having the formulation indicated below was stirred in a sand grinder.

|  | parts |
| --- | --- |
| Co-containing $\gamma$-Fe$_2$O$_3$ | 100 |
| Nitrocellulose | 9.5 |
| Polyurethane resin | 5 |
| Oleic acid | 0.5 |
| Carbon black | 4 |
| Cr$_2$O$_3$ | 2.5 |
| Methyl ethyl ketone | 200 |
| Butyl acetate | 50 |

The resulting mother liquor was mixed with 8 parts of polyisocyanate and methyl ethyl ketone to prepare a magnetic coating solution of 40 poise. The solution was applied onto one surface of a polyester film 15 μm thick by gravure coating to form a magnetic layer having a dry thickness of 5 μm. A coating solution comprising 100 parts of silicone oil ("KF-96H-1,000,000" of Shinetsu Chemical Industry Co., Ltd.) and 19,900 parts of methyl ethyl ketone was applied onto the other surface of the polyester film by coil bar coating, and the resulting silicone oil layer (coated amount: 5 mg/m$^2$) was dried. Then, the magnetic layer was super-calendered, and slit into a video tape sample ½ wide.

COMPARATIVE EXAMPLE 1

A video tape sample was prepared as in Example 1 except that no silicone oil layer was formed.

EXAMPLE 2

Video tape samples were prepared as in Example 1 except that silicone oil was applied in amounts of 0.1 mg/m$^2$, 0.5 mg/m$^2$, 1 mg/m$^2$, 10 mg/m$^2$, 20 mg/m$^2$ and 50 mg/m$^2$.

EXAMPLE 3

Video tape samples were prepared as in Example 1 except that silicone oils having viscosities of 10 centistokes, 100 centistokes, 6,000 centistokes and 10,000 centistokes were used.

COMPARATIVE EXAMPLE 2

A video tape sample was prepared as in Comparative Example 1 except that the magnetic layer contained 1 part of silicone oil ("KF-96H-1,000,000" of Shinetsu Chemical Industry Co., Ltd.).

EXAMPLE 4

A video tape sample was prepared as in Example 1 except that the order of the super-calendering and application of silicone oil was reversed and that the silicone oil was applied in a dry amount of 5 mg/m$^2$.

COMPARATIVE EXAMPLE 3

A video tape sample was prepared as in Comparative Example 1 except that a coating of antistatic paint ("Colkote" of Nippon Colkote Kagaku K.K.) was formed on the surface of the base opposite the magnetic layer in an amount of 5 mg/m$^2$.

COMPARATIVE EXAMPLE 4

A video tape sample was prepared as in Comparative Example 1 except that a coating of antistatic paint ("Colkote" of Nippon Colkote Kagaku K.K.) was formed on the surface of the base opposite the magnetic layer in a thickness of 0.5μ.

The three characerisitics of the respective video tape samples were checked with a betamax video cassette recorder (VTR). The results are set forth in Table 1 below.

Increase in dropouts

The number of dropouts occurring with the respective virgin tapes (DO$_S$) were counted. The tapes were run in the VTR 100 times successively. They were held at 40° C. for 48 hours, cooled to ordinary temperatures, and run again in a record/reproduce mode to count the number of dropouts occurring (DO$_3$). The difference between the two values (DO$_E$−DO$_S$) as obtained per minute is indicated in Table 1.

Deposit of dust particles due to scraped base

The respective virgin tapes were run on the VTR 100 times, and checked for any buildup of dust particles on the transport system in contact with the base surface.

Dust buildup on the magnetic head

A black-and-white step wave was recorded on the respective tapes. The tapes were run on the VTR 100 times and the video quality was checked visually as the tapes were run.

TABLE 1

| Run No. | Coating on the Back Surface of the Base | | | Increased Dropouts per Minute | White Powder Deposit | Dust Buildup on Head |
| --- | --- | --- | --- | --- | --- | --- |
|  | Silicone Oil or Colkote | Viscosity *1 | Coating Amount or Thickness |  |  |  |
| Example 1 | Silicone oil | 1,000,000 CS | 5 mg/m$^2$ | 2 | None | None |
| Comparative Example 1 | — | — | — | 95 | Present | " |
| Example 2 | Silicone oil | 1,000,000 CS | 0.1 mg/m$^2$ | 15 | None | A little |
| " | " | " | 0.5 mg/m$^2$ | 7 | " | None |
| " | " | " | 1.0 mg/m$^2$ | 2 | " | " |
| " | " | " | 10 mg/m$^2$ | 1 | " | " |
| " | " | " | 20 mg/m$^2$ | 0 | " | " |
| " | " | " | 50 mg/m$^2$ | 0 | " | None *2 |
| Example 3 | " | 10 CS | 5 mg/m$^2$ | 25 | Trace | " |
| " | " | 100 CS | " | 10 | None | " |
| " | " | 6,000 CS | " | 5 | " | " |
| " | " | 100,000 CS | " | 3 | " | " |
| Comparative Example 2 | Silicone oil (in magnetic paint) | 1,000,000 CS | 1 wt % | 35 | Some | Present |
| Example 4 | Silicone oil (after super-calendering) | 1,000,000 CS | 5 mg/m$^2$ | 0 | None | None |

TABLE 1-continued

| Run No. | Coating on the Back Surface of the Base | | | Increased Dropouts per Minute | White Powder Deposit | Dust Buildup on Head |
|---|---|---|---|---|---|---|
| | Silicone Oil or Colkote | Viscosity *1 | Coating Amount or Thickness | | | |
| Comparative Example 3 | Colkote | — | 5 mg/m² | 80 | Present | Present |
| Comparative Example 4 | " | — | Thickness 0.5μ | more than 100 | " | " |

*1: "CS" means centistokes.
*2: The tape fouled the calender roll a bit during its preparation.

The video tape of Comparative Example 2 having no silicone oil layer on the back surface of the base caused many dropouts and produced a buildup of white powder on the VTR. The white powder comprised polyester particles. The video tape of Example 1 according to the present invention caused very few dropouts and produced no white powder buildup on the VTR and no dust buildup on the video head. Results as good as those in Example 1 were obtained in Example 2 wherein the amount of silicone oil applied to the back surface of the base was varied from 0.1 to 50 mg/m². However, with respect to adaptability to commercial production the sample having a silicone oil coating of 50 mg/m² fouled the calender roll a bit. With respect to stability characteristics the sample having a silicone oil coating of 0.1 mg/m² was a bit inferior in the ability to prevent increased dropouts. Therefore, the range of 0.5 to 20 mg/m² is more preferred.

The samples of Examples 1 and 3 wherein the viscosity of the silicone oil was varied within the range of from 10 to 1,000,000 centistokes were far better than those of Comparative Examples 1 to 4. However, the samples using silicone oils having a viscosity of 10 and 100 centistokes were not as good as those using other viscosities since they caused more dropouts and produced a trace amount of white powder buildup on the VTR. Therefore, the viscosity of silicone oil is preferably at least 6,000 centistokes. The sample of Example 4 that was prepared by applying the silicone oil onto the base after super-calendering was good in all respects.

The sample of Comparative Example 2 using a magnetic paint containing silicone oil appears somewhat effective against increased dropouts. However, it is apparently inferior to the samples of the present invention since it produces a white powder deposit on the VTR and dust buildup on the video head. The samples of Comparative Examples 3 to 4 wherein the antistatic paint (Colkote) was applied to the back surface of the base were inferior to the samples of the present invention in all respects.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic support base having a first and second side;
   a magnetic layer positioned on said first side of said non-magnetic support base; and
   a silicone oil layer consisting essentially of a high-viscosity silicone oil having a viscosity of at least 6,000 centistokes at 25° C., formed on said second surface of said non-magnetic support base.

2. A magnetic recording medium as claimed in claim 1, wherein said viscosity is at least 100,000 centistokes at 25° C.

3. A magnetic recording medium as claimed in any of claims 1 or 2, wherein said silicone oil is an oil compound selected from the group of compounds consisting of dimethyl polysiloxane, methylphenyl polysiloxane or fluorine-containing polysiloxane.

4. A magnetic recording medium as claimed in claim 3, wherein said silicone oil is a dimethyl polysiloxane having the formula

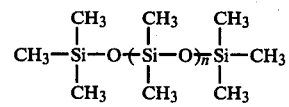

wherein n is an integer.

5. A magnetic recording medium as claimed in claim 1, wherein said silicone oil is positioned on said second side of said non-magnetic support base in an amount of 0.5 to 20 mg/m².

6. A magnetic recording medium as claimed in claim 1, wherein said silicone oil layer consists of a high viscosity silicone oil having a viscosity of at least 6,000 centistokes at 25° C.

7. A magnetic recording medium as claimed in claim 1, wherein said magnetic layer comprises ferromagnetic particles dispersed in a binder.

8. A magnetic recording medium as claimed in claim 7, wherein said ferromagnetic particles are Co-containing γ-Fe₂O₃.

* * * * *